US011248771B2

(12) United States Patent
Wolak-Gorczyca et al.

(10) Patent No.: US 11,248,771 B2
(45) Date of Patent: Feb. 15, 2022

(54) LIGHT BEAM FORMING MODULE, ESPECIALLY IN THE VEHICLE EXTERNAL LIGHTING SYSTEM

(71) Applicant: VARROC LIGHTING SYSTEMS, s.r.o., Šenov u Nového Jičína (CZ)

(72) Inventors: Aleksandra Wolak-Gorczyca, Cracow (PL); Bartosz Glowacz, Modlnica (PL)

(73) Assignee: VARROC LIGHTING SYSTEMS, S.R.O., Senov u Noveho Jicina (CZ)

( * ) Notice: Subject to any disclaimer, the term of this patent is extended or adjusted under 35 U.S.C. 154(b) by 0 days.

(21) Appl. No.: 17/222,466

(22) Filed: Apr. 5, 2021

(65) Prior Publication Data
US 2021/0310633 A1    Oct. 7, 2021

(30) Foreign Application Priority Data
Apr. 3, 2020  (PL) .......................................... 433492

(51) Int. Cl.
| | |
|---|---|
| *F21V 7/00* | (2006.01) |
| *F21S 41/32* | (2018.01) |
| *F21V 7/05* | (2006.01) |
| *F21V 7/06* | (2006.01) |
| *F21S 43/31* | (2018.01) |

(52) U.S. Cl.
CPC .......... *F21V 7/0091* (2013.01); *F21S 41/322* (2018.01); *F21S 43/315* (2018.01); *F21V 7/05* (2013.01); *F21V 7/06* (2013.01)

(58) Field of Classification Search
CPC ............................ F21V 7/0091; F21S 41/322
See application file for complete search history.

(56) References Cited

U.S. PATENT DOCUMENTS

2016/0230949 A1*  8/2016  de Lamberterie .... F21S 41/322

FOREIGN PATENT DOCUMENTS

| CN | 110715257 A | 1/2020 |
|---|---|---|
| KR | 20100027805 A | 3/2010 |

* cited by examiner

*Primary Examiner* — Sean P Gramling
(74) *Attorney, Agent, or Firm* — Cantor Colburn LLP (57) ABSTRACT

A light beam forming module, in particular in the vehicle external lighting system, is in the form of a monolithic body formed of a plurality of contiguous cross-sectional segments, each of which includes an entrance surface facing the light source, an exit surface, and a first total internal reflection surface and at least another total internal reflection surface. A first total internal reflection surface is positioned downstream of the entrance surface, and at least one further total internal reflection surface has a shaped optical structure formed thereon.

17 Claims, 11 Drawing Sheets

LIGHT BEAM FORMING MODULE, ESPECIALLY IN THE VEHICLE EXTERNAL LIGHTING SYSTEM

CROSS-REFERENCE TO RELATED APPLICATIONS

This application claims the benefit of Polish Application Serial No. P.433492 filed Apr. 3, 2020, the disclosure of which is incorporated herein by reference in its entirety.

INTRODUCTION

The present disclosure relates to a light beam forming module, adapted for use in a vehicle external lighting system. The light beam forming module can be used both as a module for a front lighting system, a rear lighting system, or a signal lamp in a motor vehicle.

There are known solutions of beam forming modules in the lighting systems of motor vehicles, in which, through appropriate shaping and directed light propagation, the desired output lighting parameters are achieved for a given application. A known effect used in this type of modules is the phenomenon of total internal reflection, which uses the fact that the light falling on the line between the media from the side of the medium with a higher refractive index at an angle greater than the limit angle, does not pass to the other medium, but is completely reflected within the first medium. In one example, a monolithic body facilitates the improvement of uniformity and brightness of light. The rays introduced into the module from the light source are subject to total internal reflection on two border surfaces located parallel to each other and at an angle to the light source. In another example, an exterior lighting system for a vehicle has a light guide module that includes a light receiving area along with first, second, and third light propagation areas downstream and along a light propagation direction in the module. The light receiving area is shaped so that the divergent light beam introduced into the module is guided inside the module as a collimated beam. The first propagation region has a first reflecting surface. The second propagation area is assigned to the first propagation area along the light propagation path and includes the first light transmitting shaped area and the second reflecting surface. The third propagation area following the second propagation area is provided with a second light transmitting shaped area which is the light exit surface from the module.

With regard to headlights and lamps of the automotive lighting system, customers are expressing more and more interest in solutions ensuring the so-called "crystal look", i.e. a smooth and unshaped surface at the output of the lighting module, providing uniform external lighting. For this purpose, manufacturers provide systems in which an additional optical filter is placed in the area of the exit surface of the module. Adding another element in the system complicates the construction and assembly and causes problems with guiding and maintaining the beam parameters, especially when it is necessary to maintain the space between the module with a stepped structure and the external filter.

Considering the above, the objective of the present disclosure is to develop a new solution of the module forming a light beam that allows to obtain a crystalline effect of an external lighting element and a uniform light beam, not disturbed by glare and internal shadows, also ensuring control over the direction of light propagation to meet the verification conditions related to the lighting in which the module was used. At the same time, the objective of the disclosure is also to propose an easy-to-assemble structure, devoid of additional elements installed on the user-accessible exit surface of the module.

According to the disclosure, the light beam forming module, in particular in the external lighting system of a vehicle, is formed as a monolithic body of a plurality of contiguous cross-sectional segments, each of which includes an entrance surface facing the light source, an exit surface, and a first total internal reflection surface and at least another area of total internal reflection. The light beam forming module is characterized in that a first total internal reflection surface is positioned downstream of the entrance surface, and at least one further total internal reflection surface has a shaped optical structure formed therein.

Preferably, the first surface of total internal reflection is paraboloidal.

Also preferably, the first surface of total internal reflection is flat.

Preferably, it comprises a first total internal reflection area and a second total internal reflection area, wherein the second total internal reflection area forming the basis of the light beam forming module and having a shaped optical structure.

Then it is preferable if the exit surface is inclined in relation to the second surface of total internal reflection at an angle ranging from 50° to 75°.

Also preferably, it comprises a first total internal reflection area, a second total internal reflection area and a third total internal reflection area, wherein the second total internal reflection area being the basis of the beam forming module and the third total internal reflection area is facing the second total internal reflection area.

Preferably, the second total internal reflection surface is provided with a contoured optical structure.

Also preferably, the third total internal reflection surface is provided with a contoured optical structure.

It is also preferred that the second total internal reflection surface and the third total internal reflection surface are provided with a contoured optical structure.

Preferably, the exit surface is inclined with respect to the second surface of total internal reflection by an angle ranging from 105°-130°.

Moreover, preferably, the entrance surface is inclined with respect to the second surface of total internal reflection by an angle ranging from 160°-175°.

Preferably, the shaped optical structure is formed by a plurality of contiguous shaped elements.

Preferably, the shaped elements are formed as spherical elements.

Preferably, the shaped elements are formed as elements of rectangular cross-section.

Preferably, the shaped elements are formed as elements of triangular cross-section.

Preferably, the shaped elements are convex elements.

Also preferably, the shapes are concave-shaped elements.

In addition, it is preferred that the shaped optical structure is formed on the first surface of total internal reflection.

The light beam forming module according to the disclosure, and due to the lack of an additional filter, provides a simple and compact structure with a clear and strong effect of uniform and crystalline illumination at the module output. The location of the shaped optical structure on at least one of the second and third surfaces of the total internal reflection makes it completely invisible from the perspective of the exit surface and does not visually affect the effect of the light emitting from the module. The module can be successfully used and installed in various vehicle models and with the use of both divergent and parallel light beam from a radiation source.

The subject of the invention is presented in the embodiments and figures wherein.

For all the figures of the drawing, a constant three-dimensional reference system with the X, Y and Z axes was used, with the direction of light propagation assumed along the X axis.

Figure 1:
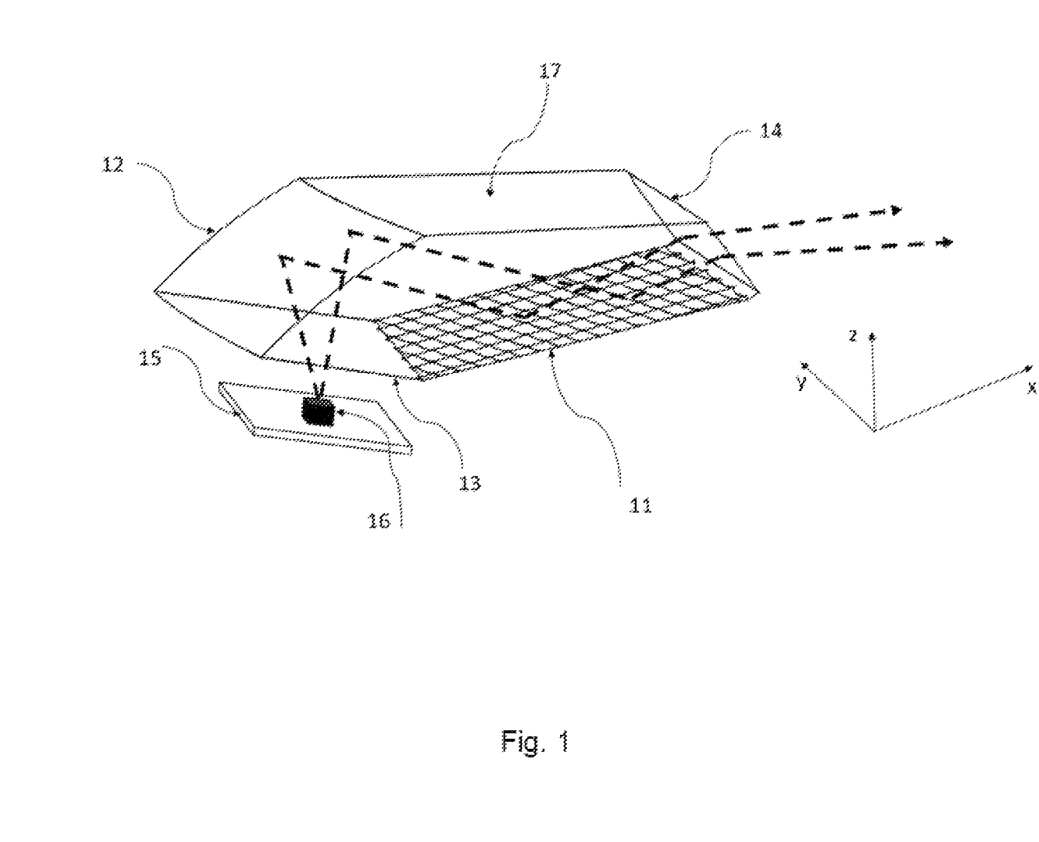
FIG. 1 shows a single segment of cross-sections of the light beam forming module according to the first embodiment.
Figure 2:
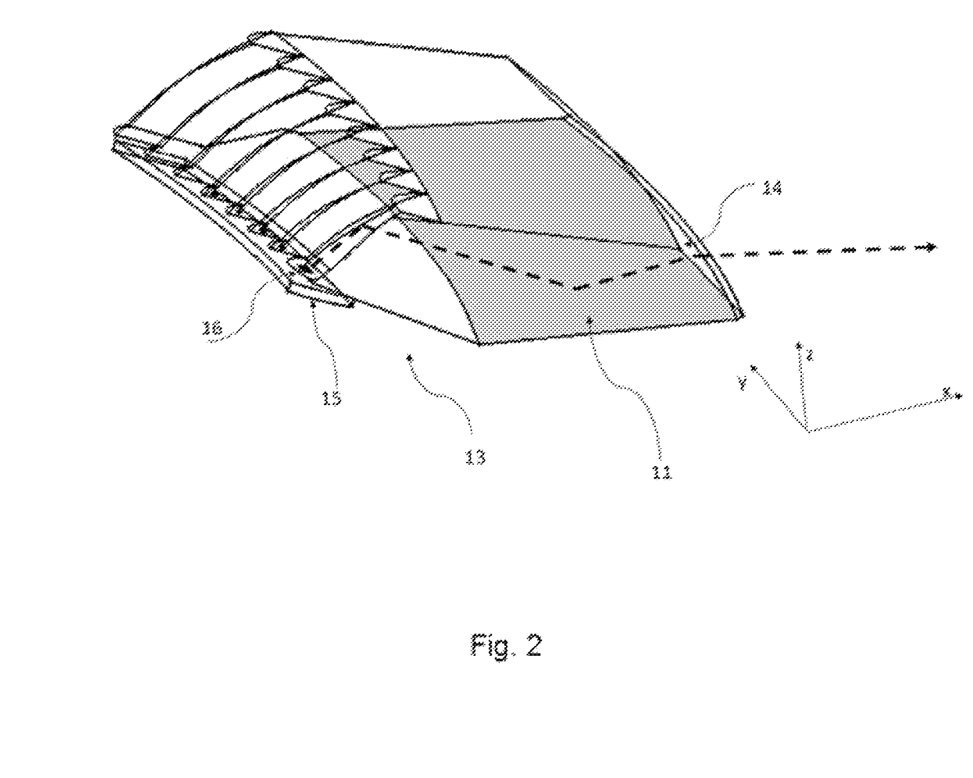
FIG. 2 shows a perspective view of a light beam forming module according to the invention.

According to FIG. 1, a single segment of the light forming module comprises an entrance surface 13, an exit surface 14, and a first total internal reflection surface 12 and a second total internal reflection surface 11 as well as an upper surface 17 facing the fixture plate 15 of the light source 16. It will be obvious to those skilled in the art that segment shown in FIG. 1 *t* is just a fragment of the monolithic body of the light beam forming module, which, according to the invention, consists of a plurality of adjacent segments. A single segment is shown as isolated for clarity of presentation of the embodiment. A monolithic light beam forming module according to the invention is shown in FIG. 2, which also shows the retainer plate 15 as extending along the entire width (measured in relation to the Y axis) of the light entrance surface 13. The retainer plate 15 is provided with a plurality of light sources 16, separate for each segment. A single cross-sectional view forming a segment of the light beam forming module is shown in turn in FIG. 3.

According to the exemplary embodiment, the entrance surface 13 is a flat surface, inclined at an angle of 160° to the second surface 11 of total internal reflection that forms the basis of the light-forming module. A paraboloid-shaped first surface 12 of total internal reflection extends from the entrance surface 13. As specifically shown in FIG. 2—the light beam forming module according to the exemplary embodiment consists of eight segments with a paraboloidally extending first surface 12 of total internal reflection. Accordingly, the first total internal reflection surface 12 is not a planar surface, but comprises eight (8) paraboloidal segments along both the Y axis and the Z axis. Due to this design of the first total internal reflection surface 12, the divergent light beam 33 incident from the light source 16 is transformed into a parallel light beam 34 due to total internal reflection from the first total internal reflection surface 12 into a parallel light beam 34, which is then directed towards the second total internal reflection surface 11.

The second total internal reflection surface 11 forms the basis of the light beam forming module and has a shaped optical structure formed thereon which is responsible for beam forming before passing through the exit surface 14. After being reflected from the second surface 11 of total internal reflection, containing the optically shaped structure, the light beam 35 is directed towards the exit surface 14 and passes through it refracting to form a divergent light beam 36 with parameters conforming to the requirements of the present disclosure.

According to the presented embodiment, the exit surface 14 is inclined with respect to the second surface 11 of total internal reflection at an angle of 65°. In addition, for a given embodiment, the upper surface 17 facing the first surface 11 of total internal reflection is a flat surface and—in the case at hand—does not participate in the propagation of light.

Due to the formation of a shaped optical structure on the second surface 11 of total internal reflection, it remains invisible in the light output structure, i.e. in the light beam 36 after leaving the light exit surface 14. This allows the desired object of the disclosure to be achieved, and thus the user-perceivable effect of being aesthetic and smooth, i.e. without any reflections or shadows, of the output surface 14.

Figure 4:
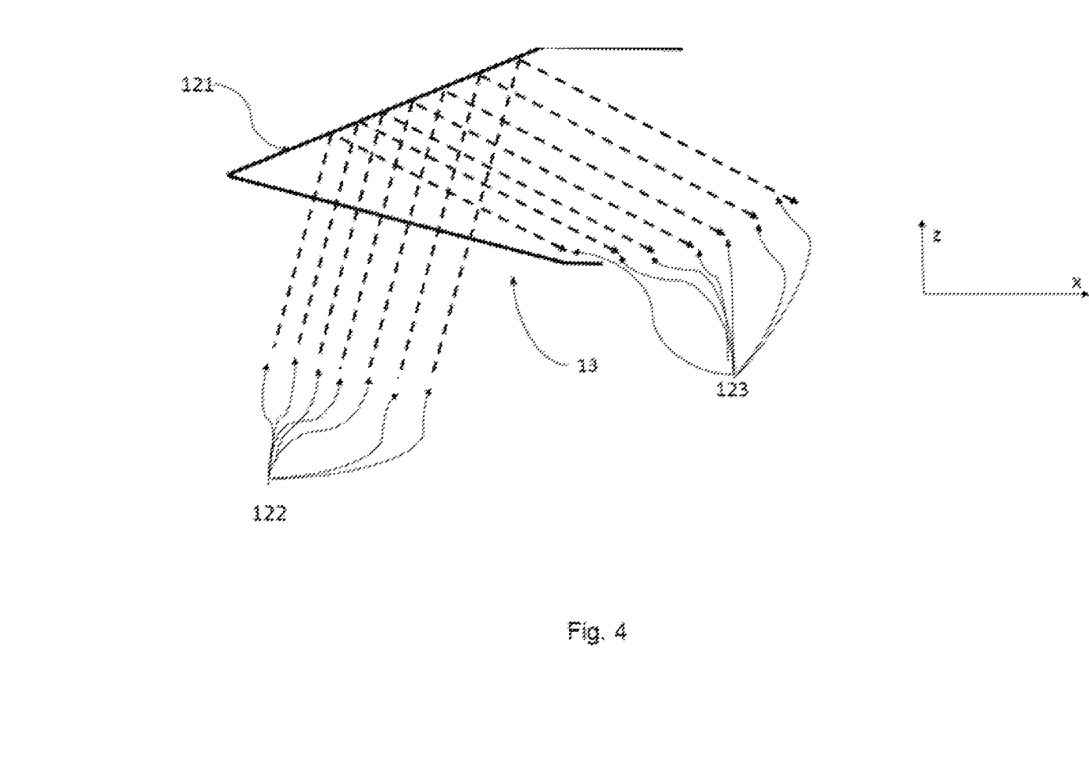
FIG. 4 shows an alternative embodiment of the first surface of total internal reflection.
Figure 5:
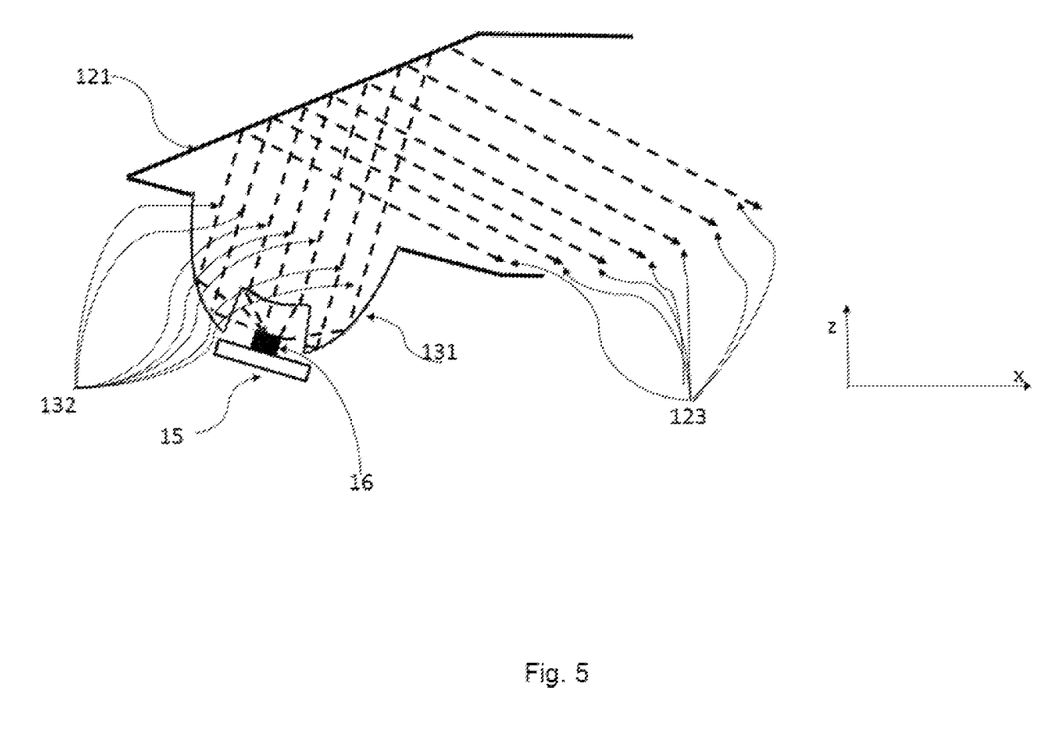
FIG. 5 shows another embodiment of a first total internal reflection surface and an entrance surface provided with a collimating optical system.
Figure 6:
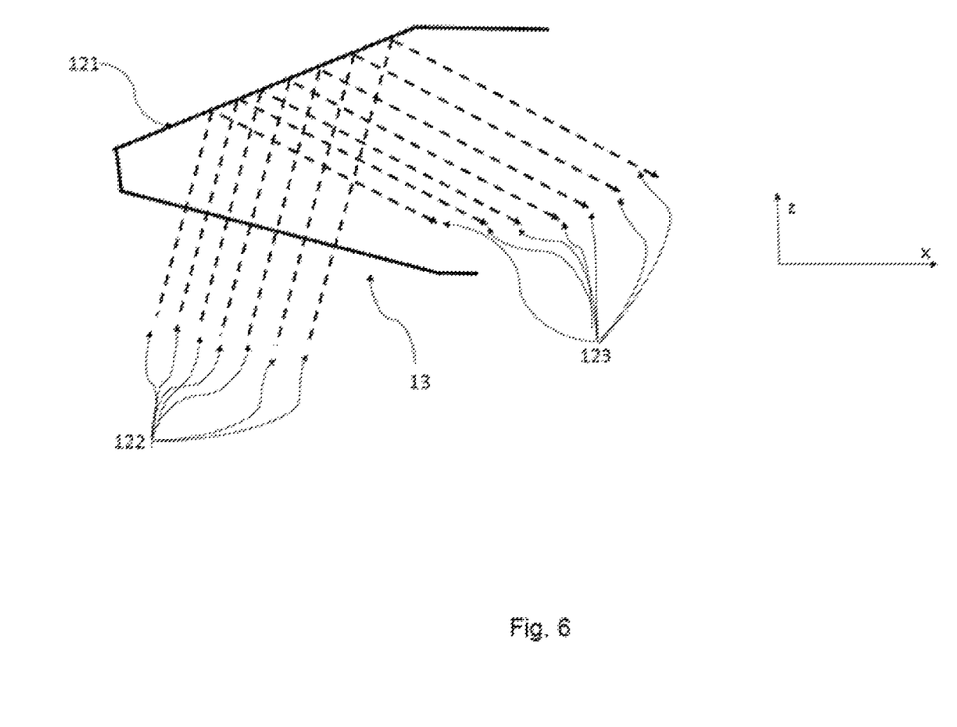
FIG. 6 shows another possible embodiment of the first surface of total internal reflection.

In addition to the above-described paraboloidal configuration of the first total internal reflection surface 12, which collimates the divergent beam incident from the light source 16, the present disclosure is also suitable for receiving light with parallel rays. Embodiments with a flat first total internal reflection surface 121 are shown in FIGS. 4, 5, and 6. According to FIG. 4, the originally collimated (i.e., external collimating system not shown) light beam strikes the flat first total internal reflection surface 121 from which the reflected light rays 123 further propagate within the light beam forming module. FIG. 5 shows an embodiment in which, in addition to a flat first surface 121 of total internal reflection, the first entrance surface 131 has a collimating optical system formed therein, allowing the divergent beam incident from the source 16 to be collimated. In turn, according to a further embodiment shown in FIG. 6, the flat first total internal reflection surface 121 does not directly contact the entrance surface 13—both of these surfaces are separated by an additional intermediate surface. Analogously to the example according to FIG. 4, parallel light rays 122 project onto the entrance surface 13, wherein the external arrangement collimating the radiation from the light source 16 is not shown in the figure in this case.

Figure 7:
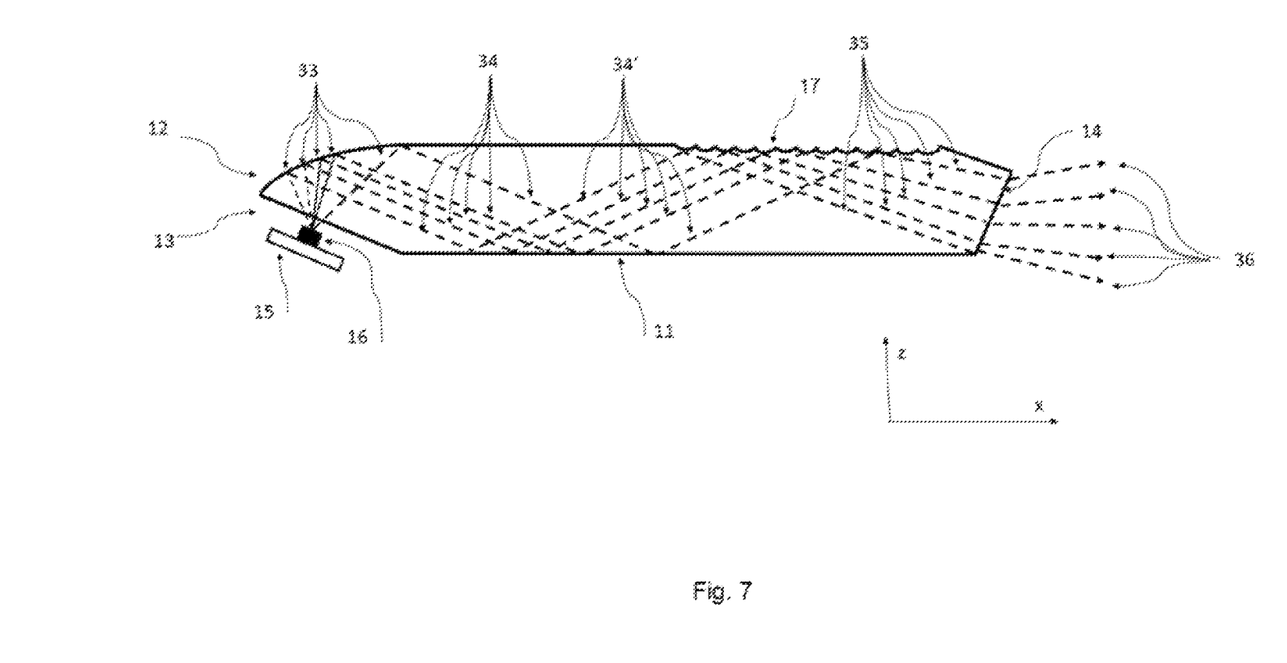
FIG. 7 shows a cross-section of the segment according to the second embodiment.

FIG. 7, another embodiment of a light beam forming module is shown comprising an entrance surface 13, a paraboloidal first total internal reflection surface 12, a second total internal reflection surface 11, and a third total internal reflection surface 17, wherein the second total internal reflection surface 11 and a third total internal reflection surface 17 internal reflections face each other. According to the presented embodiment, the exit surface 14 is inclined with respect to the second surface 11 of total internal reflection at an angle of 110°. In this case also—the third total internal reflection surface 17 has a shaped optical structure formed therein. The shaped optical structure—according to the presented embodiment—is formed in the part involved in the process of light propagation and reflection. It will be appreciated by those skilled in the art, however, that the shaped optical structure can also be formed over the entire surface of total internal reflection.

Figure 3:
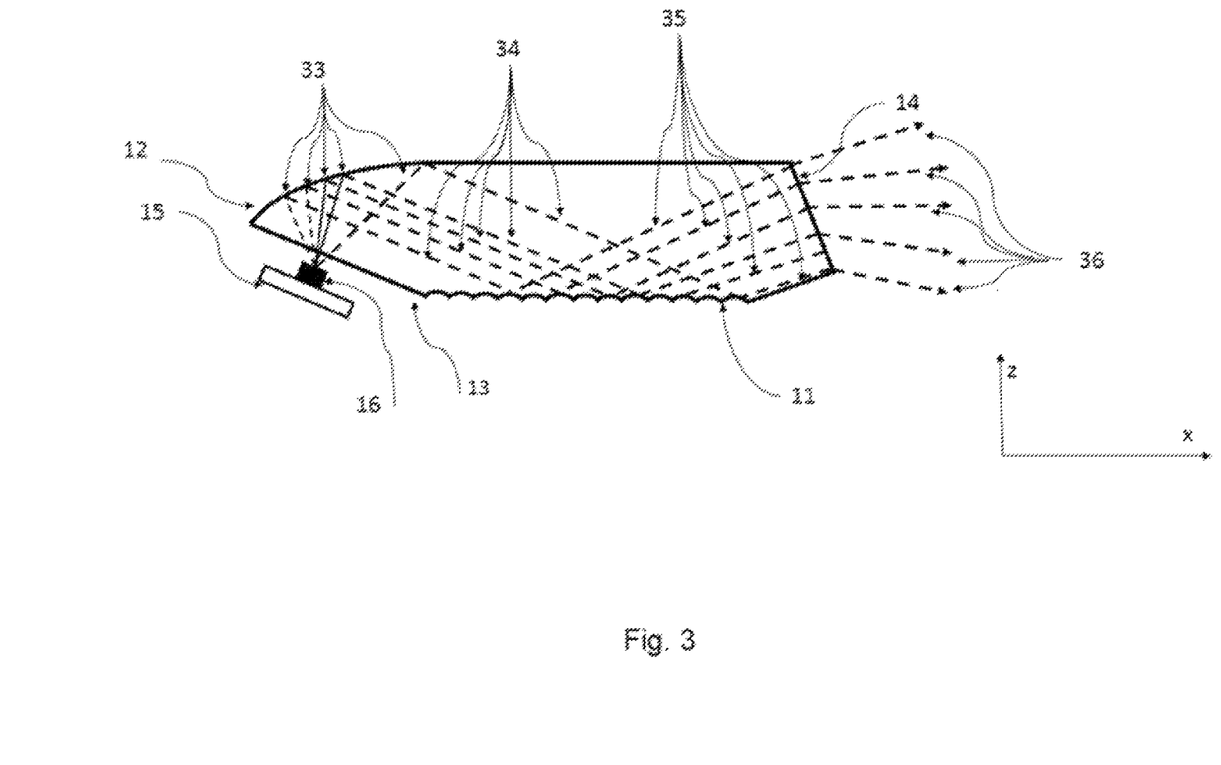
FIG. 3 shows a cross-section of the segment from FIG. 1.

In the present case, the course of the rays of the input light 33 and light 34 after reflection from the first surface 12 of the total internal reflection is analogous to the embodiment shown in FIG. 1-3. After being reflected from the second surface 11 of total internal reflection, light 34' is directed to the third surface 17 of total internal reflection and then propagates as rays of light 35 towards the exit surface 14, whereby the output light 36 is obtained.

Figure 8:
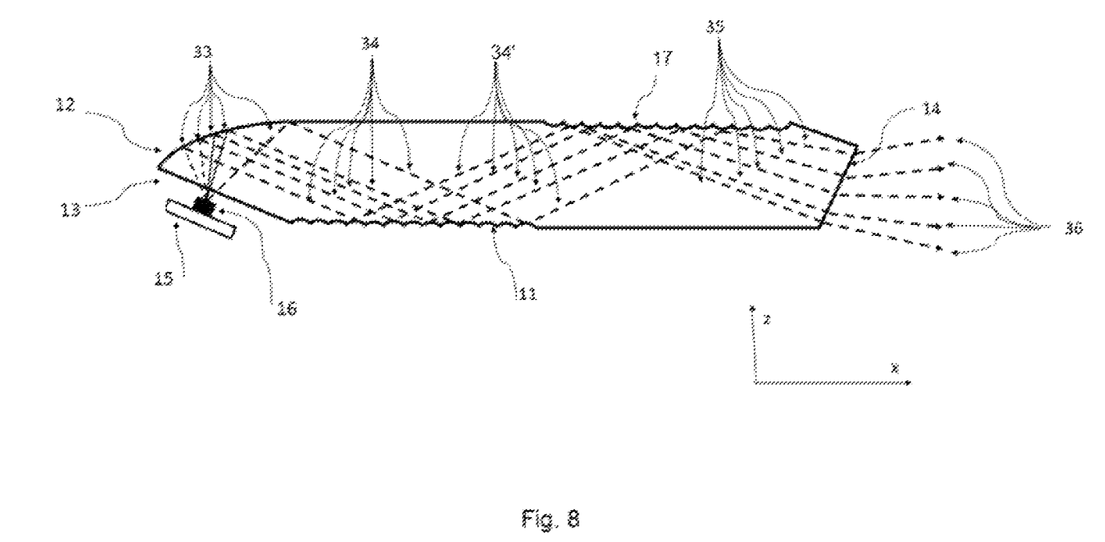
FIG. 8 shows a cross-section of the segment according to the third embodiment.

Within the scope of the invention, it is also possible to provide a shaped optical structure both on the second surface 11 of total internal reflection and on the third surface 17 of total internal reflection, which is shown in the embodiment in FIG. 8. According to the embodiment, the entrance surface 13, the first total internal reflection surface 12, and the exit surface 14 are formed according to the example shown in FIG. 7. It will also be obvious to a person skilled in the art that the shaped optical structure can be formed over the entire area of the second surface 11 of total internal reflection and the third surface 17 of total internal reflection, respectively, as well as—as shown in FIG. 8—in the part involved in the process of light propagation and reflection.

Figure 9:
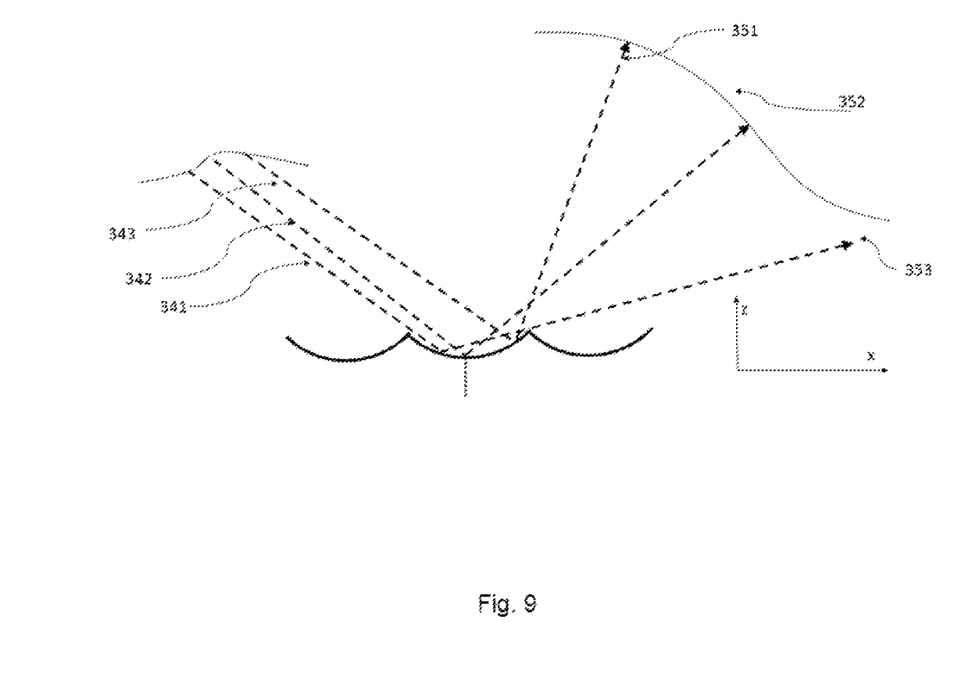
FIG. 9 shows a system of reflection of rays from a shaped optical structure formed as a concave structure.
Figure 10:
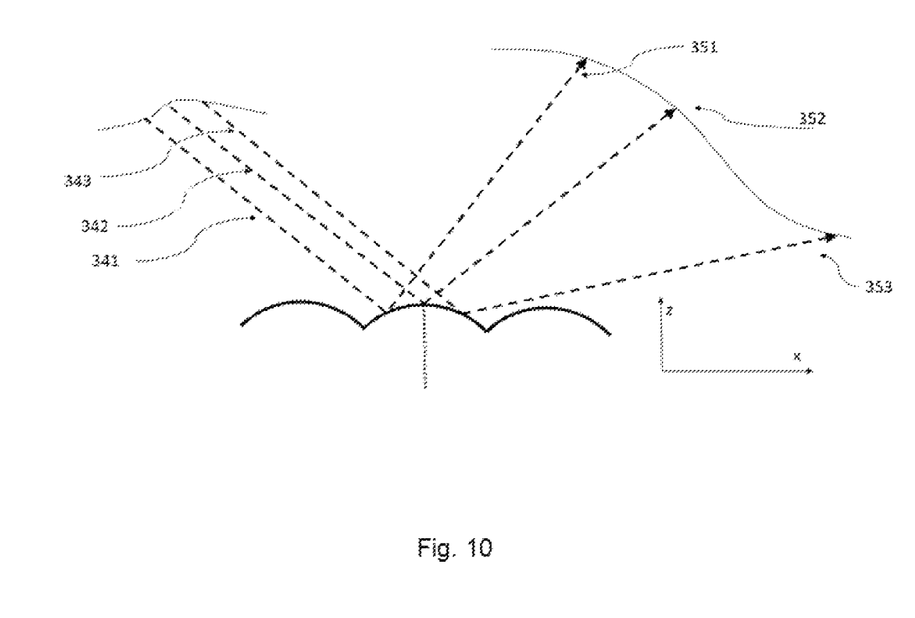
FIG. 10 shows a system of reflection of rays from a shaped optical structure formed as a convex structure.

In terms of forming a shaped optical structure—it is a standard light beam forming structure in solutions for systems and modules of external vehicle lighting. This structure is formed by a plurality of adjacent shape elements. The shaped elements can be spherical—as for example shown in FIGS. 9 and 10. It is also allowed to use the standard, although not shown in the figure, forming of the shaped elements with rectangular, triangular or other geometric cross-sections. The shaped optical structure can also be formed as a concave structure or a convex structure—the path of the rays before the reflection 341, 342 and 343 as well as after the reflection 351, 352 and 353 from the given shaped optical structure is shown in FIG. 9 and FIG. 10.

Figure 11:
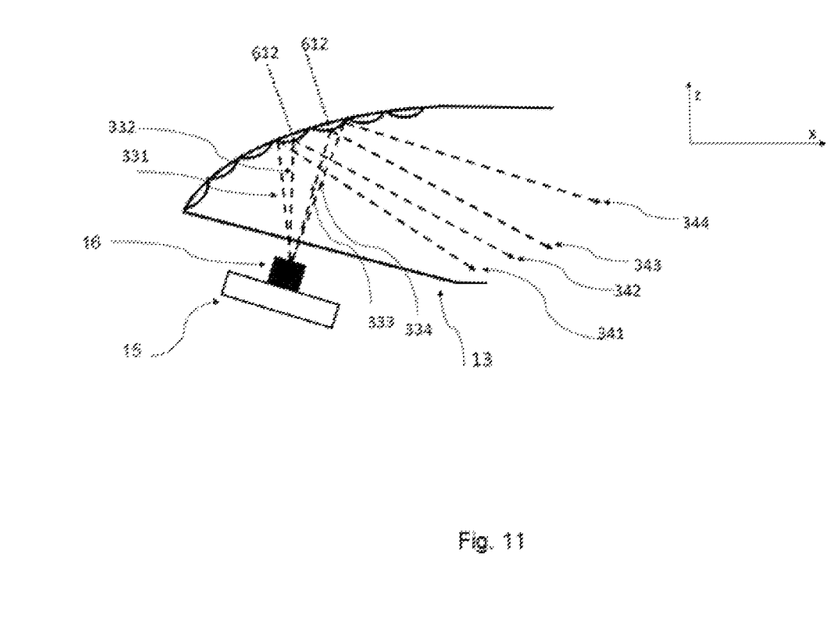
FIG. 11 shows an embodiment of a first total internal reflection surface provided with a shaped optical structure.

In addition to the inventive forming of a shaped optical structure on at least one of the next total internal reflection surface, i.e. the first surface 11 of total internal reflection and the third surface 17 of total internal reflection—this structure may additionally be provided on the first surface 12 of total internal reflection. A suitable embodiment is illustrated in FIG. 11, in which rays of the incoming light 331, 332, 333 and 334 emitted from the light source 16 are reflected from the shaped elements 612 of the optical pattern structure formed on the first surface 12 of total internal reflection, thereby making possible additional correction of the path of rays 341, 342, 343 and 344.

While the present disclosure is described with reference to exemplary embodiments, it will be understood by those skilled in the art that various changes may be made and equivalents may be substituted without departing from the scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

The invention claimed is:

1. A light beam forming module, in particular in a vehicle external lighting system, in the form of a monolithic body formed of a plurality of contiguous cross-sectional segments, each of which includes an entrance surface facing a light source, an exit surface, and a first total internal reflection surface and at least one further total internal reflection surface characterized in that the first total internal reflection surface is positioned downstream of the entrance surface and the at least one further total internal reflection surface has a shaped optical structure formed therein, and wherein divergent light beams emitted from the light source are refracted into the respective cross-sectional segment through the entrance surface, are then internally reflected off of the first total internal reflection surface, are internally reflected off of the shaped optical structure, and refracted through the exit surface.

2. The light beam forming module according to claim 1, wherein the first total internal reflection surface is paraboloidal shaped.

3. The light beam forming module according to claim 1, wherein the first total internal reflection surface is formed as a flat surface.

4. The light beam forming module according to claim 1, wherein the at least one further total internal reflection surface includes a second total internal reflection surface adapted to form the basis of the light beam forming module via the shaped optical structure.

5. The light beam forming module according to claim 4, wherein the exit surface is inclined with respect to the second total internal reflection surface by an angle ranging from 50°-75°.

6. The light beam forming module according to claim 4, wherein the at least one further total internal reflection surface includes a third total internal reflection surface situated opposite the second total internal reflection surface.

7. The light beam forming module according to claim 6, wherein the third total internal reflection surface is provided with a shaped optical structure.

8. The light beam forming module according to claim 1, wherein the entrance surface is inclined in relation to the second total internal reflection surface at an angle between 160°-175°.

9. The light beam forming module according to claim 1, wherein the shaped optical structure is formed by a plurality of adjacent shapes.

10. The light beam forming module according to claim 9, wherein the shaped optical structure is formed as spherical elements.

11. The light beam forming module according to claim 9, wherein the shaped optical structure is formed as elements of rectangular cross-section.

12. The light beam forming module according to claim 9, wherein the shaped optical structure is formed as elements of triangular cross-section.

13. The light beam forming module according to claim 9, wherein the shaped optical structure is formed as convex elements.

14. The light beam forming module according to claim 9, wherein the shaped optical structure is formed as concave elements.

15. The light beam forming module according to claim 1, wherein a shaped optical structure is formed on the first total internal reflection surface.

16. A light beam forming module, in particular in a vehicle external lighting system, in the form of a monolithic body formed of a plurality of contiguous cross-sectional segments, each of which includes an entrance surface facing a light source, an exit surface, and a first total internal reflection surface and at least one further total internal reflection surface characterized in that the first total internal reflection surface is positioned downstream of the entrance surface and the at least one further total internal reflection surface has a shaped optical structure formed therein, wherein the exit surface is inclined in relation to the second total internal reflection surface at an angle within a range of 105°-130°.

17. A light beam forming module adapted for use in a vehicle external lighting system, the light beam forming module comprising:
- a light source adapted to emit a plurality of diverging light beams; and
- a body including;
    - an entrance surface facing the light source, wherein the plurality of diverging light beams are refracted into the body through the entrance surface,
    - a first internal reflection surface being paraboloidal shaped such that the refracted plurality of light beams are internally reflected off of the first internal reflection surface and into a plurality of reflected light beams in a parallel orientation,
    - a second internal reflection surface including a shaped optical structure that opposes the first internal reflection surface, and adapted such that the plurality of reflected light beams are internally reflected off of the shaped optical structure, and
    - an exit surface adapted such that the plurality of reflected light beams internally reflected off of the shaped optical structure are refracted through the exit surface.

\* \* \* \* \*